(12) United States Patent
Remes et al.

(10) Patent No.: US 11,670,494 B2
(45) Date of Patent: Jun. 6, 2023

(54) SYSTEMS AND METHODS FOR PERFORMING TANDEM MASS SPECTROMETRY

(71) Applicant: Thermo Finnigan LLC, San Jose, CA (US)

(72) Inventors: Philip M. Remes, Livermore, CA (US); Michael W. Senko, Sunnyvale, CA (US)

( * ) Notice: Subject to any disclaimer, the term of this patent is extended or adjusted under 35 U.S.C. 154(b) by 219 days.

(21) Appl. No.: 17/135,749

(22) Filed: Dec. 28, 2020

(65) Prior Publication Data

US 2022/0208535 A1    Jun. 30, 2022

(51) Int. Cl.
| | |
|---|---|
| *H01J 49/00* | (2006.01) |
| *G01N 30/72* | (2006.01) |
| *G01N 30/86* | (2006.01) |
| *G01N 30/02* | (2006.01) |

(52) U.S. Cl.
CPC ...... *H01J 49/0081* (2013.01); *G01N 30/7233* (2013.01); *G01N 30/8631* (2013.01); *H01J 49/0036* (2013.01); *G01N 2030/027* (2013.01)

(58) Field of Classification Search
CPC ............ H01J 49/0081; H01J 49/0036; H01J 49/0045; H01J 49/0031; G01N 30/7233; G01N 30/8631; G01N 2030/027
USPC .................................................. 250/281, 282
See application file for complete search history.

(56) References Cited

U.S. PATENT DOCUMENTS

| | | | |
|---|---|---|---|
| 7,297,941 B2 * | 11/2007 | Senko ................. | H01J 49/0036 250/288 |
| 7,943,899 B2 | 5/2011 | Senko et al. | |

* cited by examiner

*Primary Examiner* — Michael Maskell

(57) ABSTRACT

A method of performing tandem mass spectrometry includes supplying a sample to a chromatography column, directing components included in the sample and eluting from the chromatography column to a mass spectrometer, acquiring a series of mass spectra including intensity values of ions produced from the components as a function of m/z of the ions, extracting, from the series of mass spectra, a plurality of detection points representing intensity as a function of time for a selected m/z, estimating, based on the plurality of detection points extracted from the series of mass spectra, a relative position of a selected detection point included in the plurality of detection points, and performing, at the mass spectrometer and based on the estimated relative position, a dependent acquisition for the selected m/z. The relative position of the selected detection point represents a position of the selected detection point relative to an expected reference point.

31 Claims, 13 Drawing Sheets

SYSTEMS AND METHODS FOR PERFORMING TANDEM MASS SPECTROMETRY

BACKGROUND INFORMATION

A mass spectrometer is a sensitive instrument that may be used to detect, identify, and/or quantify molecules based on their mass-to-charge ratio (m/z). A mass spectrometer generally includes an ion source for generating ions from components included in the sample, a mass analyzer for separating the ions based on their m/z, and an ion detector for detecting the separated ions. The mass spectrometer may be connected to a computer-based software platform that uses data from the ion detector to construct a mass spectrum that shows a relative abundance of each of the detected ions as a function of m/z. The m/z of ions may be used to detect and quantify molecules in simple and complex mixtures. A separation device such as a liquid chromatograph, gas chromatograph, or capillary electrophoresis device may be coupled to the mass spectrometer to separate components included in the sample before the components are introduced to the mass spectrometer.

Tandem mass spectrometry is a technique that analyzes ions produced from the components in two or more successive stages to acquire mass spectra of precursor ions and/or product ions (e.g., ions produced by dissociation of precursor ions during intermediate dissociation stages). Two-stage tandem mass spectrometry is typically referred to as mass spectrometry/mass spectrometry (MS/MS). In a data-dependent acquisition (DDA) procedure, a fixed number of precursor ions whose m/z values were recorded in a survey acquisition (e.g., a full-spectrum MS scan) are selected, using predetermined rules, for tandem mass spectrometry (e.g., MS/MS) in which the selected precursor ions are subjected to a one or more additional stages of mass analysis to generate product ion mass spectra.

The DDA procedure makes efficient use of the mass spectrometer's resources by performing a costly MS/MS analysis on a selected m/z only when the presence of a component of interest eluting from the separation device is confirmed by the survey acquisition. In many typical analyses, hundreds of components may elute from the separation device at substantially the same time. To enable MS/MS analysis of the largest number of components eluting from the separation device, a dynamic exclusion window is applied so that tandem mass spectrometry is performed for each selected m/z only once for a period of time. However, the predetermined rules typically trigger MS/MS for each selected m/z when the corresponding intensity value has just risen above a minimum threshold and while the intensity value is relatively weak. As a result, longer ion accumulation times are required to achieve an acceptable quality MS/MS spectrum for the selected m/z. However, longer accumulation times increase the amount of time required for each MS/MS acquisition, and hence fewer components can be analyzed by MS/MS.

SUMMARY

The following description presents a simplified summary of one or more aspects of the methods and systems described herein in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative embodiments, an illustrative method of performing tandem mass spectrometry comprises supplying a sample to a chromatography column; directing components included in the sample and eluting from the chromatography column to a mass spectrometer; acquiring a series of mass spectra including intensity values of ions produced from the components as a function of m/z of the ions; extracting, from the series of mass spectra, a plurality of detection points representing intensity as a function of time for a selected m/z; estimating, based on the plurality of detection points extracted from the series of mass spectra, a relative position of a selected detection point included in the plurality of detection points, the relative position of the selected detection point representing a position of the selected detection point relative to an expected reference point; and performing, at the mass spectrometer and based on the estimated relative position, a dependent acquisition for the selected m/z.

In some illustrative embodiments, the relative position of the selected detection point comprises a normalized intensity value of the selected detection point, the normalized intensity value representing a ratio of the detected intensity value of the selected detection point to an expected maximum intensity value for the selected m/z.

In some illustrative embodiments, the plurality of detection points extracted from the series of mass spectra are included in a sliding window, the sliding window including a current detection point.

In some illustrative embodiments, the selected detection point comprises the current detection point.

In some illustrative embodiments, the method further comprises determining that the normalized intensity value exceeds a threshold value, wherein the dependent acquisition is performed in response to the determining that the normalized intensity value exceeds the threshold value.

In some illustrative embodiments, the threshold value is between about 0.5 and about 1.0.

In some illustrative embodiments, the threshold value is between about 0.8 and about 1.0.

In some illustrative embodiments, the relative position of the selected detection point comprises a temporal distance of the selected detection point to an expected time point for the selected m/z.

In some illustrative embodiments, the relative position of the selected detection point comprises a region of an expected elution profile for the selected m/z and in which the selected detection point is located.

In some illustrative embodiments, the dependent acquisition for the selected m/z comprises an MS/MS acquisition.

In some illustrative embodiments, the performing the dependent acquisition comprises scheduling the dependent acquisition for a future time based on the relative position of the selected detection point and performing the dependent acquisition at the future time.

In some illustrative embodiments, the scheduling the dependent acquisition comprises estimating, based on the estimated relative position, an expected time of a maximum intensity value for the selected m/z, wherein the future time comprises the estimated expected time of the maximum intensity value for the selected m/z.

In some illustrative embodiments, an apparatus for performing tandem mass spectrometry comprises a mass spectrometer configured to receive components included in a sample and eluting from a chromatography column and analyze ions produced from the components, and a computing device configured to acquire, from the mass spectrometer, a series of mass spectra including intensity values of ions produced from the components as a function of m/z of the ions; extract, from the series of mass spectra, a plurality of detection points detected by the mass spectrometer over time for each of a plurality of different selected m/z; estimate, based on the plurality of detection points for each respective selected m/z, a relative position of a selected detection point included in each plurality of detection points, each relative position representing a position of the selected detection point relative to an expected reference point for the respective selected m/z; and control the mass spectrometer to perform, based on the estimated relative positions, a plurality of dependent acquisitions.

In some illustrative embodiments, each estimated relative position comprises a normalized intensity value of the respective selected detection point, the normalized intensity value representing a ratio of the detected intensity value of the selected detection point to an expected maximum intensity value for the selected m/z, and the computing device is configured to control the mass spectrometer to perform the plurality of dependent acquisitions based on a numerical order of the estimated normalized intensity values.

In some illustrative embodiments, the plurality of dependent acquisitions comprises a dependent acquisition for each selected m/z for which a corresponding selected detection point has a normalized intensity value exceeding a threshold value.

In some illustrative embodiments, the controlling the mass spectrometer to perform the plurality of dependent acquisitions comprises scheduling each of the plurality of dependent acquisitions for a different future time based on a numerical order of the normalized intensity values and controlling the mass spectrometer to perform each of the plurality of dependent acquisitions at the respective future time.

In some illustrative embodiments, the scheduling each of the plurality of dependent acquisitions comprises estimating, based on the estimated normalized intensity values, an expected time of a maximum intensity value for each selected m/z, wherein each respective future time comprises the estimated expected time of the maximum intensity value for the respective selected m/z.

In some illustrative embodiments, a non-transitory computer-readable medium stores instructions that, when executed, cause a processor of a computing device to acquire a first data set comprising a series of mass spectra including intensity values of ions produced from analytes eluting from a chromatography column as a function of m/z of the ions; extract a second data set from the first data set, the second data set including a plurality of detection points representing intensity as a function of time for a selected mass-to-charge ratio (m/z); estimate, based on the second data set, a relative position of a selected detection point included in the second data set, the relative position of the selected detection point representing a position of the selected detection point relative to an expected reference point for the selected m/z; and control, based on the estimated relative position, the mass spectrometer to perform a data-dependent action.

In some illustrative embodiments, the data-dependent action comprises performing tandem mass spectrometry.

In some illustrative embodiments, the controlling the mass spectrometer to perform the data-dependent action comprises scheduling the mass spectrometer to perform tandem mass spectrometry for the selected m/z at a future time.

In some illustrative embodiments, the scheduling the mass spectrometer to perform tandem mass spectrometry for the selected m/z at the future time comprises estimating, based on the estimated relative position of the selected detection point, an expected time of a maximum intensity value for the selected m/z, wherein the future time comprises the estimated expected time of the maximum intensity value for the selected m/z.

In some illustrative embodiments, a system comprises a chromatography column configured to receive a sample and separate components included in the sample; a mass spectrometer configured to receive the components eluting from the chromatography column and analyze ions produced from the components; and a computing device configured to acquire a series of mass spectra including intensity values of ions produced from the components as a function of m/z of the ions; extract, from the series of mass spectra, a plurality of detection points representing intensity as a function of time for a selected m/z; estimate, based on the plurality of detection points extracted from the series of mass spectra, a relative position of a selected detection point included in the plurality of detection points, the relative position of the selected detection point representing a position of the selected detection point relative to an expected reference point, and control, based on the estimated relative position, the mass spectrometer to perform a dependent acquisition for the selected m/z.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
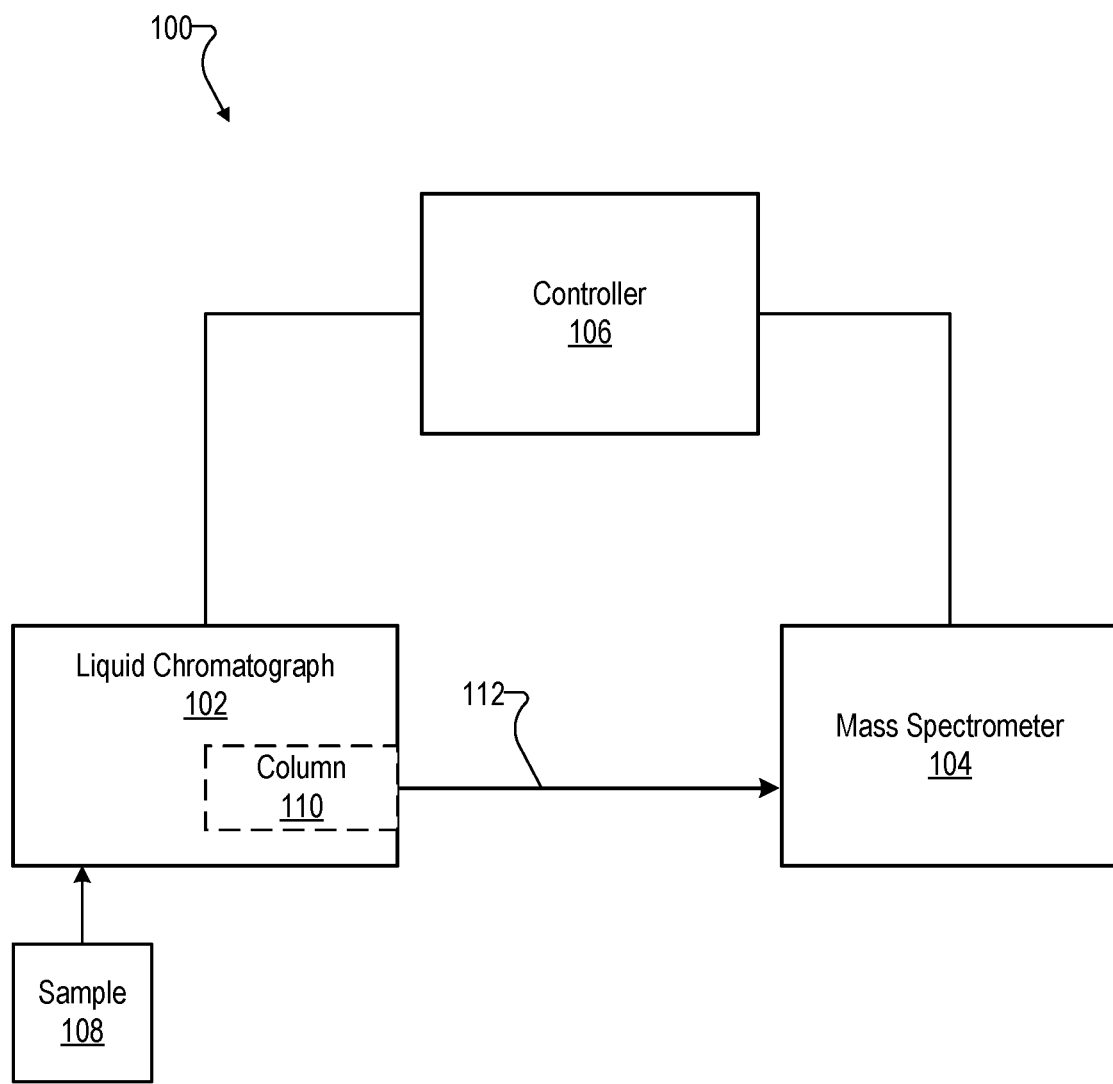
FIG. 1 shows an illustrative liquid chromatography-mass spectrometry system including a liquid chromatograph and a mass spectrometer.

Methods and systems for performing tandem mass spectrometry are described herein. In some illustrative embodiments, a method of performing tandem mass spectrometry includes supplying a sample to a chromatography column, directing components included in the sample and eluting from the chromatography column to a mass spectrometer, and acquiring a series of mass spectra. The mass spectra include intensity values of ions produced from the components as a function of m/z of the ions. A plurality of detection points are extracted from the series of mass spectra. The plurality of detection points represent intensity as a function of time (e.g., retention time) for a selected m/z. Based on the plurality of detection points extracted from the series of mass spectra, a normalized intensity value of a selected detection point included in the plurality of detection points is estimated. The normalized intensity value represents a ratio of the detected intensity value of the selected detection point to a reference intensity value (e.g., an expected maximum intensity value for the selected m/z). Based on the estimated normalized intensity value, a dependent acquisition for the selected m/z is performed. For example, tandem mass spectrometry (e.g., MS/MS) may be performed in response to a determination that the estimated normalized intensity value for the selected detection point exceeds a threshold value (e.g., 0.7).

The systems and methods described herein may provide various benefits, which may include one or more advantages over conventional systems and methods for performing tandem mass spectrometry. For example, a dependent acquisition or other data-dependent action may be triggered when the current signal intensity of a particular component is at or near the maximum intensity level (e.g., at about 70% or higher of the maximum intensity level) of the expected elution profile of the component. As a result, the dependent acquisition may be acquired with high quality (e.g., a high signal-to-noise ratio). Furthermore, a high quality dependent acquisition signal allows the mass analyzer and/or ion trap accumulation time to be shorter than when the dependent acquisition signal is of lower quality, thereby decreasing the time required to perform a dependent acquisition and allowing a greater number of co-eluting components to be analyzed by tandem mass spectrometry.

Various embodiments will now be described in more detail with reference to the figures. The systems and methods described herein may provide one or more of the benefits mentioned above and/or various additional and/or alternative benefits that will be made apparent herein.

In some implementations, the methods and systems for performing tandem mass spectrometry may be used in conjunction with a combined separation-mass spectrometry system, such as a liquid chromatography-mass spectrometry (LC-MS) system. As such, an LC-MS system will now be described. The described LC-MS system is illustrative and not limiting. The methods and systems described herein may operate as part of or in conjunction with the LC-MS system described herein and/or with any other suitable separation-mass spectrometry system, including a high-performance liquid chromatography-mass spectrometry (HPLC-MS) system, a gas chromatography-mass spectrometry (GC-MS) system, or a capillary electrophoresis-mass spectrometry (CE-MS) system.

FIG. 1 shows an illustrative LC-MS system 100. LC-MS system 100 includes a liquid chromatograph 102, a mass spectrometer 104, and a controller 106. Liquid chromatograph 102 is configured to separate, over time, components (e.g., analytes) within a sample 108 that is injected into liquid chromatograph 102. Sample 108 may include, for example, chemical components (e.g., molecules, ions, etc.) and/or biological components (e.g., metabolites, proteins, lipids, etc.) for detection and analysis by LC-MS system 100. Liquid chromatograph 102 may be implemented by any liquid chromatograph as may suit a particular implementation. In liquid chromatograph 102, sample 108 may be injected into a mobile phase (e.g., a solvent), which carries sample 108 through a column 110 containing a stationary phase (e.g., an adsorbent packing material). As the mobile phase passes through column 110, components within sample 108 elute from column 110 at different times based on, for example, their size, their affinity to the stationary phase, their polarity, and/or their hydrophobicity. A detector (e.g., a spectrophotometer) may measure the relative intensity of a signal modulated by each separated component in eluate 112 from column 110. Data generated by the detector may be represented as a chromatogram, which plots retention time on the x-axis and a signal representative of the relative intensity on the y-axis. The retention time of a component is generally measured as the period of time between injection of sample 108 into the mobile phase and the relative intensity peak maximum after chromatographic separation. In some examples, the relative intensity may be correlated to or representative of relative abundance of the separated components. Data generated by liquid chromatograph 102 may be output to controller 106.

In some cases, particularly in analyses of complex mixtures, multiple different components in sample 108 may co-elute from column 110 at approximately the same time, and thus may have the same or similar retention times. As a result, determination of the relative intensity of the individual components within sample 108 requires further separation of the individual components. To this end, liquid chromatograph 102 directs components included in eluent 112 to mass spectrometer 104.

Mass spectrometer 104 is configured to ionize the components received from liquid chromatograph 102 and sort or separate the produced ions based on m/z of the ions. A detector in mass spectrometer 104 measures the intensity of the signal produced by the ions. As used herein, "intensity" or "signal intensity" may refer to any suitable metric, such as abundance, relative abundance, ion count, intensity, relative intensity, etc. Data generated by the detector may be represented by mass spectra, which plot the intensity of the observed signal as a function of m/z of the ions. Data acquired by mass spectrometer 104 may be output to controller 106.

Figure 2:
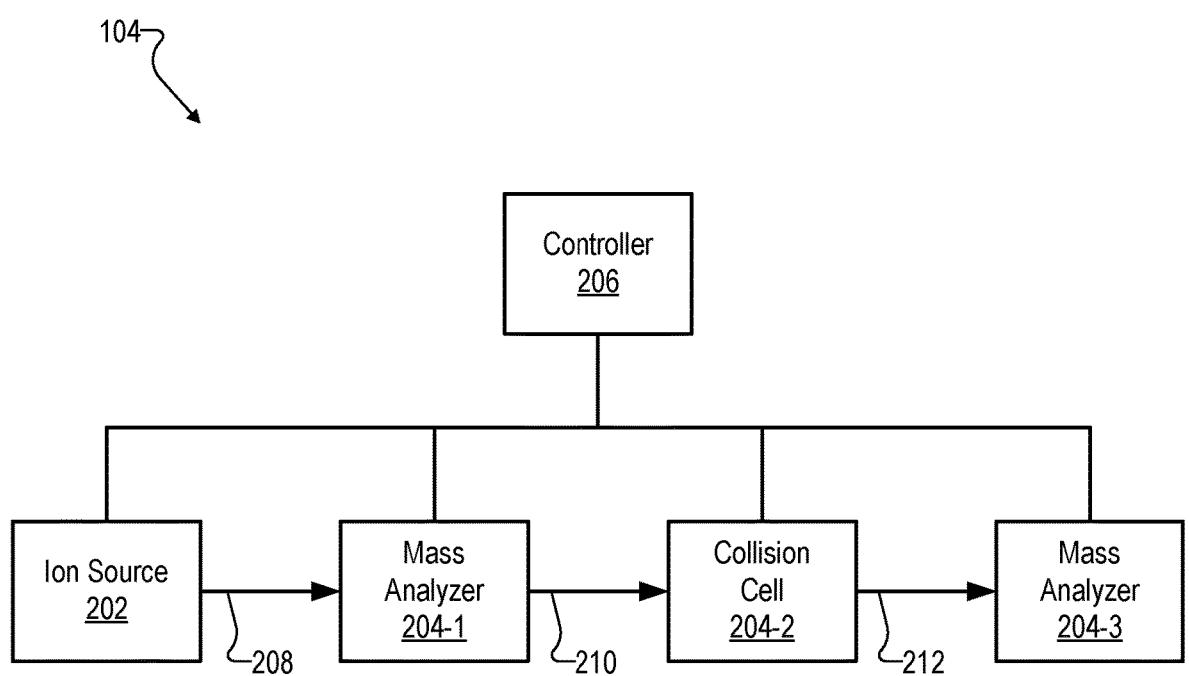
FIG. 2 shows an illustrative implementation of the mass spectrometer of FIG. 1.

Mass spectrometer 104 may be implemented by any suitable mass spectrometer, such as a tandem mass spectrometer configured to perform tandem mass spectrometry (e.g., MS/MS), a multi-stage mass spectrometer configured to perform multi-stage mass spectrometry (also denoted MSn), a hybrid mass spectrometer, and the like. FIG. 2 shows an illustrative implementation of mass spectrometer 104. As shown, mass spectrometer 104 is tandem-in-space (e.g., has multiple mass analyzers) and has two stages for performing MS/MS. However, mass spectrometer 104 is not limited to this configuration but may have any other suitable configuration. For example, mass spectrometer 104 may have a single mass analyzer and may be tandem-in-time. Additionally or alternatively, mass spectrometer 104 may be a multi-stage mass spectrometer and may have any suitable number of stages (e.g., three or more) for performing multi-stage tandem mass spectrometry (e.g., MS/MS/MS).

As shown, mass spectrometer 104 includes an ion source 202, a first mass analyzer 204-1, a collision cell 204-2, a second mass analyzer 204-3, and a controller 206. Mass spectrometer 104 may further include any additional or alternative components not shown as may suit a particular implementation (e.g., ion optics, filters, an autosampler, a detector, etc.).

Ion source 202 is configured to produce a stream 208 of ions from the components and deliver the ions to first mass analyzer 204-1. Ion source 202 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 202 may include various components for producing ions from components included in sample 108 and delivering the ions to first mass analyzer 204-1.

First mass analyzer 204-1 is configured to receive ion stream 208 and direct a beam 210 of ions (e.g., precursor ions) to collision cell 204-2. Collision cell 204-2 is configured to receive beam 210 of ions and produce product ions (e.g., fragment ions) via controlled dissociation processes. Collision cell 204-2 is further configured to direct a beam 212 of product ions to second mass analyzer 204-3. Second mass analyzer 204-3 is configured to filter and/or perform a mass analysis of the product ions.

Mass analyzers 204-1 and 204-3 are configured to separate ions according to m/z of each of the ions. Mass analyzers 204-1 and 204-3 may be implemented by any suitable mass analyzer, such as a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. an orbital electrostatic trap such as an Orbitrap mass analyzer, a Kingdon trap, etc.), a Fourier transform ion cyclotron resonance (FT-ICR) mass analyzer, a sector mass analyzer, and the like. Mass analyzers 204 need not be implemented by the same type of mass analyzer.

Collision cell 204-2 may be implemented by any suitable collision cell. As used herein, "collision cell" may encompass any structure or device configured to produce product ions via controlled dissociation processes and is not limited to devices employed for collisionally-activated dissociation. For example, collision cell 204-2 may be configured to fragment precursor ions using collision induced dissociation, electron transfer dissociation, electron capture dissociation, photo induced dissociation, surface induced dissociation, ion/molecule reactions, and the like.

An ion detector (not shown) is configured to detect ions at each of a variety of different m/z and responsively generate an electrical signal representative of ion intensity. The electrical signal is transmitted to controller 206 for processing, such as to construct a mass spectrum of the sample. For example, mass analyzer 204-3 may emit an emission beam of separated ions to the ion detector, which is configured to detect the ions in the emission beam and generate or provide data that can be used by controller 206 to construct a mass spectrum of the sample. The ion detector may be implemented by any suitable detection device, including without limitation an electron multiplier, a Faraday cup, and the like.

Controller 206 may be communicatively coupled with, and configured to control operations of, mass spectrometer 104. For example, controller 206 may be configured to control operation of various hardware components included in ion source 104 and/or mass analyzers 204-1 and 204-3. To illustrate, controller 206 may be configured to control an accumulation time of ion source 202 and/or mass analyzers 204, control an oscillatory voltage power supply and/or a DC power supply to supply an RF voltage and/or a DC voltage to mass analyzers 204, adjust values of the RF voltage and DC voltage to select an effective m/z (including a mass tolerance window) for analysis, and adjust the sensitivity of the ion detector (e.g., by adjusting the detector gain).

Controller 206 may also include and/or provide a user interface configured to enable interaction between a user of mass spectrometer 104 and controller 206. The user may interact with controller 206 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 206. In other examples the display device and/or input device may be separate from, but communicatively coupled to, controller 206. For instance, the display device and the input device may be included in a computer (e.g., a desktop computer, a laptop computer, etc.) communicatively connected to controller 206 by way of a wired connection (e.g., by one or more cables) and/or a wireless connection.

Controller 206 may include any suitable hardware (e.g., a processor, circuitry, etc.) and/or software as may serve a particular implementation. While FIG. 2 shows that controller 206 is included in mass spectrometer 104, controller 206 may alternatively be implemented in whole or in part separately from mass spectrometer 104, such as by a computing device communicatively coupled to mass spectrometer 104 by way of a wired connection (e.g., a cable) and/or a network (e.g., a local area network, a wireless network (e.g., Wi-Fi), a wide area network, the Internet, a cellular data network, etc.). In some examples, controller 206 may be implemented in whole or in part by controller 106.

Referring again to FIG. 1, controller 106 may be communicatively coupled with, and configured to control operations of, LC-MS system 100 (e.g., liquid chromatograph 102 and mass spectrometer 104). Controller 106 may include any suitable hardware (e.g., a processor, circuitry, etc.) and/or software configured to control operations of and/or interface with the various components of LC-MS system 100 (e.g., liquid chromatograph 102 or mass spectrometer 104).

For example, controller 106 may be configured to acquire, from mass spectrometer 104, a first data set comprising data acquired over time by liquid chromatograph 102 and mass spectrometer 104. The first data set may include a series of mass spectra including intensity values of ions produced from the components of sample 108 as a function of m/z of the ions. The first data set may be represented in a three-dimensional map in which time (e.g., retention time) is plotted along an x-axis, m/z is plotted along a y-axis, and intensity is plotted along a z-axis. Spectral features on the map (e.g., peaks of intensity) represent detection by LC-MS system 100 of ions produced from various components included in sample 108. The x-axis and z-axis of the map may be used to generate a mass chromatogram which plots intensity as a function of time. The y-axis and z-axis of the map represent mass spectra that plot intensity as a function of m/z.

Figure 3:
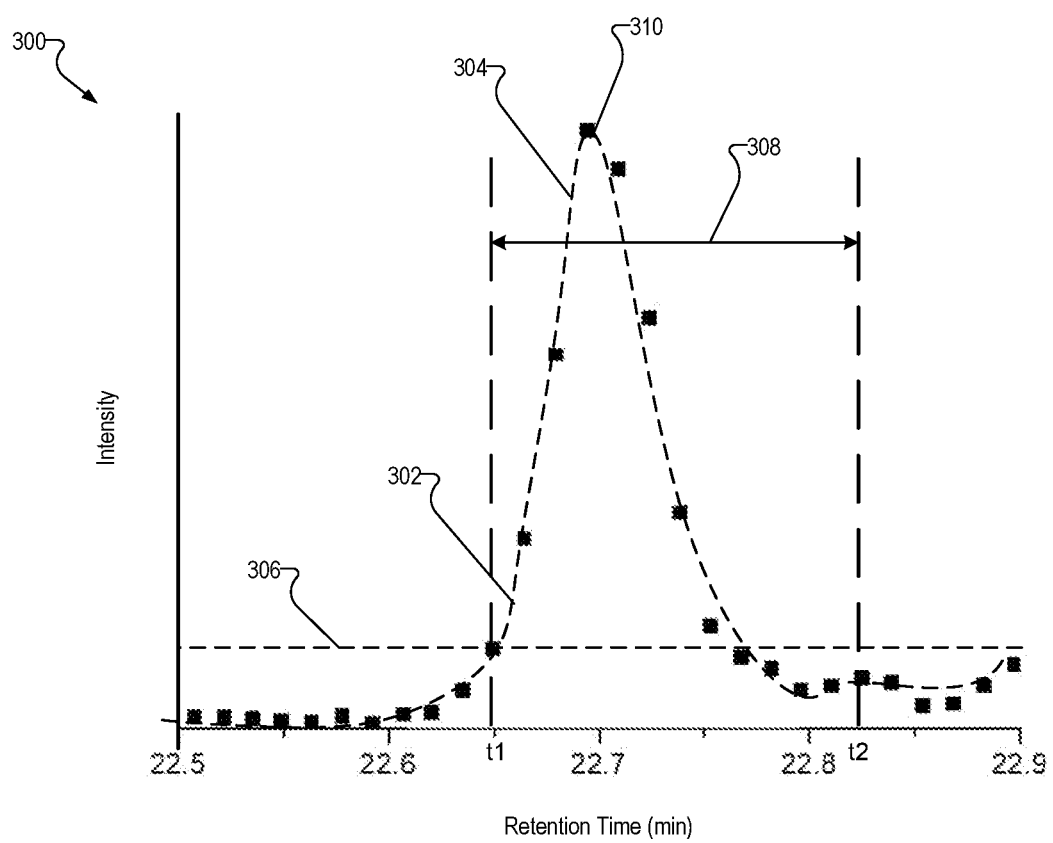
FIG. 3 shows an illustrative mass chromatogram of a selected m/z (e.g., an extracted ion chromatogram (XIC)) associated with ions produced from a component that is included in a sample and that elutes from the liquid chromatograph of FIG. 1.

FIG. 3 shows an illustrative mass chromatogram 300 (e.g., an extracted ion chromatogram (XIC)) of a selected m/z associated with ions produced from a component included in sample 108 and that elutes from liquid chromatograph 102. As used herein, a "selected m/z" may include a specific m/z with or without a mass tolerance window or a narrow range of m/z. Mass chromatogram 300 is generated from data acquired by mass spectrometer 104 during a first stage of a DDA procedure, such as a plurality of survey acquisitions (e.g., MS full-spectrum scans) or mass spectra acquisitions. Mass chromatogram 300 plots intensity (arbitrary units) as a function of retention time (in minutes). As shown, mass chromatogram 300 includes a plurality of detection points, each acquired from a different acquisition, that together form an elution profile 302 of the component (as indicated by the dashed line curve). As the component elutes from column 110, the detected intensity of the ions produces a peak 304 having a roughly Gaussian profile.

In a conventional DDA experiment, a dependent acquisition (e.g., an MS/MS scan) is triggered when elution of the component is detected. As shown in FIG. 3, elution of the component is detected at a time $t_1$ when the detected intensity value has just risen above a predetermined minimum threshold intensity value (indicated by dashed line 306), which typically occurs at the start of peak 304 and while the intensity value is relatively weak. Dynamic exclusion is applied during a time window 308 (e.g., from time $t_1$ to time $t_2$ or for the duration of the peak) so that a dependent acquisition is not performed for the selected m/z during the time window 308. To maximize the probability of matching the MS/MS spectra to a known component when the dependent acquisition is triggered early in peak 304, longer ion accumulation times are required at the mass analyzer to produce a stronger MS/MS signal for each selected m/z. However, longer ion accumulation times results in slower MS/MS acquisitions. As a result, fewer components of different selected m/z can be analyzed by MS/MS.

These issues may be addressed by triggering a dependent acquisition (e.g., an MS/MS scan) for the selected m/z when the detected intensity value is at or near the apex 310 of peak 304. However, determining whether the selected m/z is at or near apex 310 of peak 304 is a challenging signal processing problem. Previous attempts to solve the problem treated survey acquisition signals for each selected m/z as sine waves. With this technique, a Fourier analysis is performed on the data so that each point is assigned a frequency and phase value. When the phase falls within a certain range of values corresponding to the apex of the elution profile peak, a data dependent action can be taken. This procedure theoretically works well, but produces random results with real, noisy data. A better method is needed to initiate a data-dependent action at or near the apex of an elution profile peak for a selected m/z.

As will be described below in more detail, an improved method of performing tandem mass spectrometry includes estimating, based on currently acquired mass spectra, a relative position of a selected detection point in an elution profile and performing, based on the estimated relative position of the selected detection point, a data-dependent action. A relative position of a selected detection point may be the position of the selected detection point, in time or intensity, relative to a reference point in the elution profile (e.g., the apex). Additionally or alternatively, the relative position may be a region of the elution profile in which the selected detection point is located and that indicates a state of elution of the component (e.g., a baseline region, a rising region, an apex region, a falling region, etc.). The regions may be defined relative to a reference point in the elution profile (e.g., the apex).

Estimation of the relative position of the selected detection point is based on the principle that the relative position of the selected detection point is a function of detected intensity values of a plurality of detection points around (e.g., preceding and/or following) the selected detection point. Thus, the position of the selected detection point relative to the expected or predicted apex of the elution profile peak may be estimated in real-time and used to perform a data-dependent action.

Figure 4:
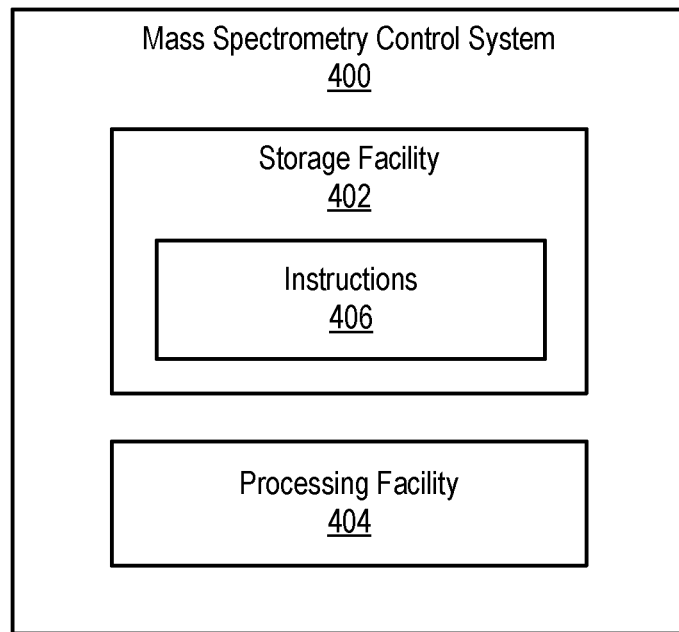
FIG. 4 shows an illustrative mass spectrometry control system.

One or more operations associated with an improved method of performing tandem mass spectrometry may be performed by a mass spectrometry control system. FIG. 4 shows an illustrative mass spectrometry control system 400 ("system 400"). System 400 may be implemented entirely or in part by LC-MS system 100 (e.g., by controller 106 and/or controller 206). Alternatively, system 400 may be implemented separately from LC-MS system 100.

System 400 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform any of the operations described herein. For example, storage facility 402 may store instructions 406 that may be executed by processing facility 404 to perform any of the operations described herein. Instructions 406 may be implemented by any suitable application, software, code, and/or other executable data instance.

Storage facility 402 may also maintain any data acquired, received, generated, managed, used, and/or transmitted by processing facility 404. For example, storage facility 402 may maintain LC-MS data (e.g., acquired chromatogram data and/or mass spectra data) and/or estimation data. Estimation data may include data representative of, used by, or associated with one or more models (e.g., machine learning models) or algorithms maintained by processing facility 404 for estimating a relative position of a selected detection point included in the LC-MS data.

Processing facility 404 may be configured to perform (e.g., execute instructions 406 stored in storage facility 402 to perform) various processing operations described herein. It will be recognized that the operations and examples described herein are merely illustrative of the many different types of operations that may be performed by processing facility 404. In the description herein, any references to operations performed by system 400 may be understood to be performed by processing facility 404 of system 400. Furthermore, in the description herein, any operations performed by system 400 may be understood to include system 400 directing or instructing another system or device to perform the operations.

Figure 5:
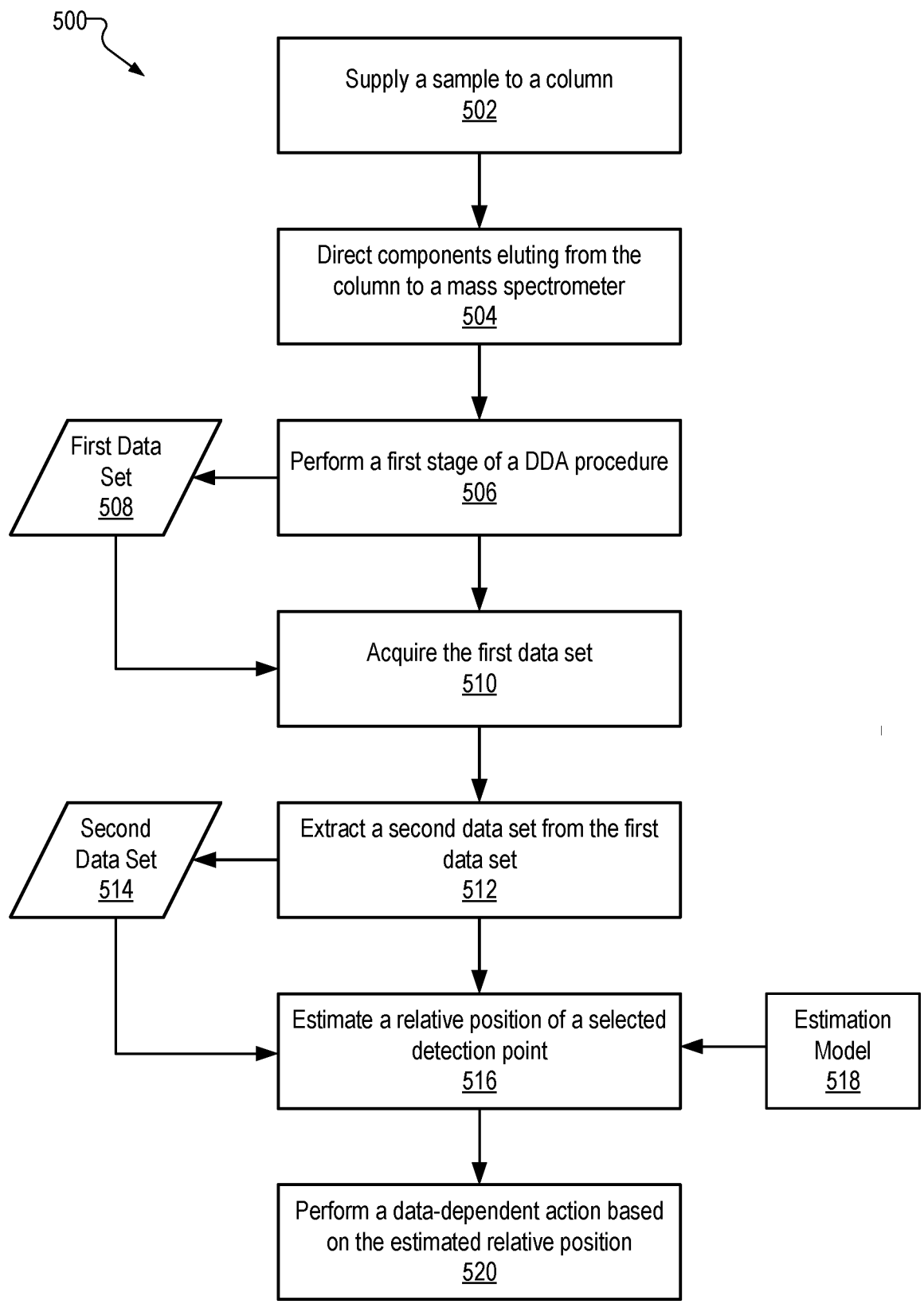
FIG. 5 shows an illustrative method of performing tandem mass spectrometry with the liquid chromatography-mass spectrometry system of FIG. 1 and the mass spectrometry control system of FIG. 4.

FIG. 5 shows an illustrative method of performing tandem mass spectrometry. While FIG. 5 shows illustrative operations according to one embodiment, other embodiments may omit, add to, reorder, and/or modify any of the operations shown in FIG. 5. One or more of the operations shown in FIG. 5 may be performed by LC-MS system 100 and/or system 400, any components included therein, and/or any implementations thereof.

In operations 502 and 504, liquid chromatograph 102 supplies sample 108 to column 110 and directs components included in sample 108 and that elute from column 110 to mass spectrometer 104. In operation 506, mass spectrometer 104 performs a first stage of a DDA procedure (e.g., full-spectrum mass spectra acquisitions, MS survey scans, etc.) as the components elute from column 110 and acquires a first data set 508 (e.g., LC-MS data) that includes a series of mass spectra including intensity values of ions produced from the components as a function of m/z of the ions.

In operation 510, system 400 acquires first data set 508 from LC-MS system 100 (e.g., mass spectrometer 104).

In operation 512, system 400 extracts a second data set 514 from first data set 508. Second data set 514 includes a plurality of detection points each from a different acquisition and representing intensity, as detected by mass spectrometer 104, as a function of time for a selected m/z. The selected m/z may be the m/z of ions produced from a particular component of interest included in sample 108 and may be selected based on mass peaks present in first data set 508. In some examples, second data set 514 comprises an XIC or source data that may be used to generate an XIC for the selected m/z.

In operation 516, system 400 estimates, based on second data set 514 and an estimation model 518, a relative position of a selected detection point included in the second data set. The relative position of the selected detection point may be a normalized intensity value of the selected detection point, a temporal distance of the selected detection point from an expected time of a reference point, or a region of the elution profile in which the selected detection point is located (e.g., a baseline region, a rising region, an apex region, a falling region, etc.), where the regions are defined relative to a reference point in the elution profile (e.g., the apex). Operation 516 may be performed in any suitable way. Illustrative embodiments of operation 516 will now be described with reference to FIGS. 6-9.

Figure 6:
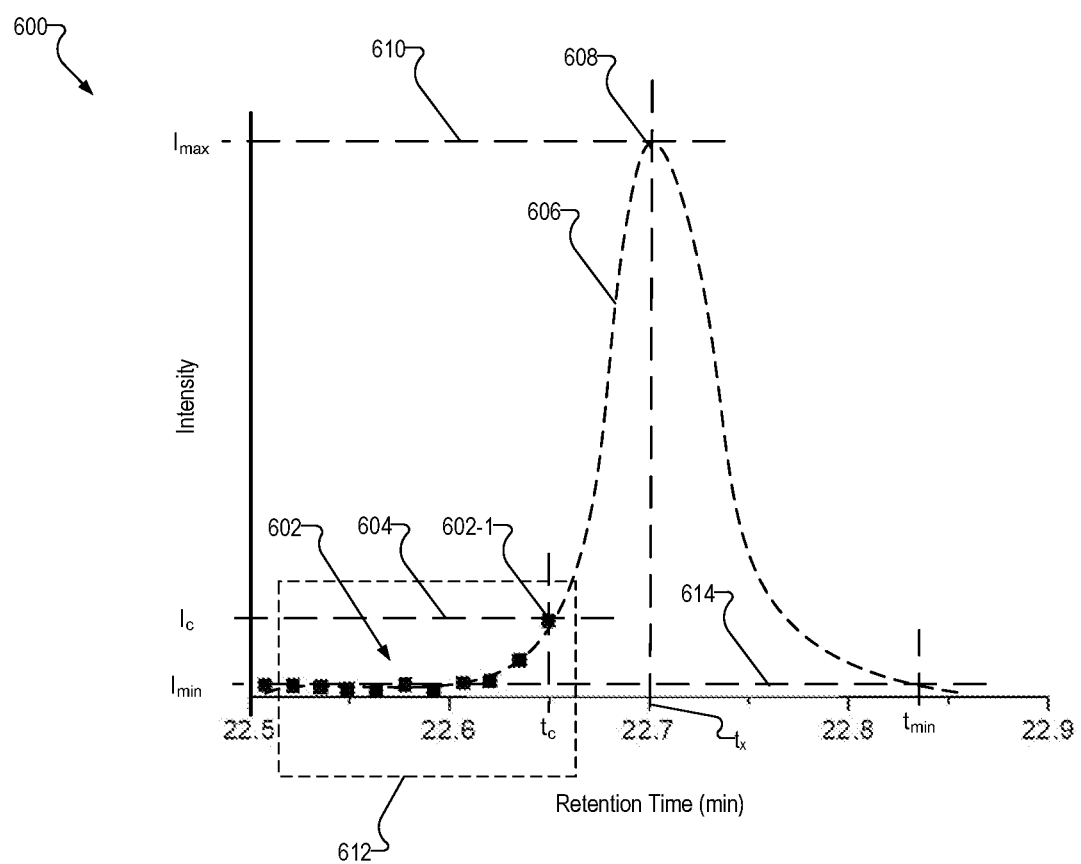
FIG. 6 shows an illustrative XIC that may be generated from, or is representative of, data acquired by the liquid chromatography-mass spectrometry system of FIG. 1 during a plurality of survey acquisitions.

FIG. 6 shows an illustrative XIC 600 that may be generated from, or is representative of, second data set 514. XIC 600 will facilitate description of operation 516, but operation 516 may be performed with raw source data without generating XIC 600. As shown, XIC 600 plots a plurality of detection points 602 each representing a detected intensity value (arbitrary units) of the selected m/z, as detected by mass spectrometer 104 during a first stage of a DDA procedure (e.g., during operation 506), as a function of retention time (in minutes). Each successive mass spectrum acquisition by mass spectrometer 104 adds a new detection point 602 to XIC 600. As shown on XIC 600, the right-most detection point 602-1 is a current (most-recent) detection point 602 acquired at current time $t_c$ and having a current intensity value $l_c$, as indicated by dashed line 604. As shown in FIG. 6, detection points 602 together form an elution profile of the component associated with the selected m/z. The upward trajectory of intensity values of detection points 602 indicates the start of a peak 606 in the expected (e.g., estimated or predicted) elution profile. In FIG. 6, the expected elution profile is represented by a dashed-line curve.

In some examples, system 400 is configured to estimate a normalized intensity value of a selected detection point 602 relative to a reference intensity value. In the examples that follow, the selected detection point 602 is the current detection point 602-1. In alternative examples, the selected detection point may be any historical detection point 602 acquired during the DDA procedure (e.g., any detection point 602 acquired prior to current time $t_c$, such as a second or third most-recent detection point 602).

In some examples, the reference intensity value is an expected maximum intensity value $l_{max}$ at apex 608 of peak 606 for the selected m/z, as indicated by dashed line 610. However, since the maximum intensity value $l_{max}$ of peak 606 has not yet been detected at current time $t_c$, intensity values for a distinct set 612 of a plurality of detection points 602 are applied as inputs to estimation model 518, which is configured to estimate the normalized intensity value of the selected detection point 602-1. In some examples, set 612 comprises a predetermined number (e.g., 6, 24, 48, 100, etc.) of detection points 602. In alternative examples, set 612 comprises only detection points 602 occurring within a sliding time window. For example, the sliding time window may encompass a period of 0.1 seconds, 0.5 seconds, 3 seconds, etc. In either configuration, the selected detection point 602 is included in the set 612.

In some examples, detection points 602 may not be evenly spaced along the time axis. To simplify processing of second data set 514, detection points 602 may be corrected (such as by interpolation) to a fixed and uniform time spacing (e.g., 1 second).

Estimation model 518 is configured to perform any suitable heuristic, process, and/or operation that may be performed or executed by system 400 to estimate a normalized intensity value of the selected detection point 602-1. In some examples, estimation model 518 may be implemented by hardware and/or software components (e.g., processors, memories, communication interfaces, instructions stored in memory for execution by the processors, etc.), such as storage facility 402 (e.g., estimation data) and/or processing facility 404 of system 400. Estimation model 518 may include any suitable algorithm and/or machine learning model configured to estimate a normalized intensity value of a selected detection point based on intensity values for a set of historical detection points. Estimation model 518 may estimate the normalized intensity value in any suitable way. In some examples, estimation model 518 comprises a machine learning model. An illustrative machine learning model, and methods of training the machine learning model, will be described below in more detail.

Figure 7:
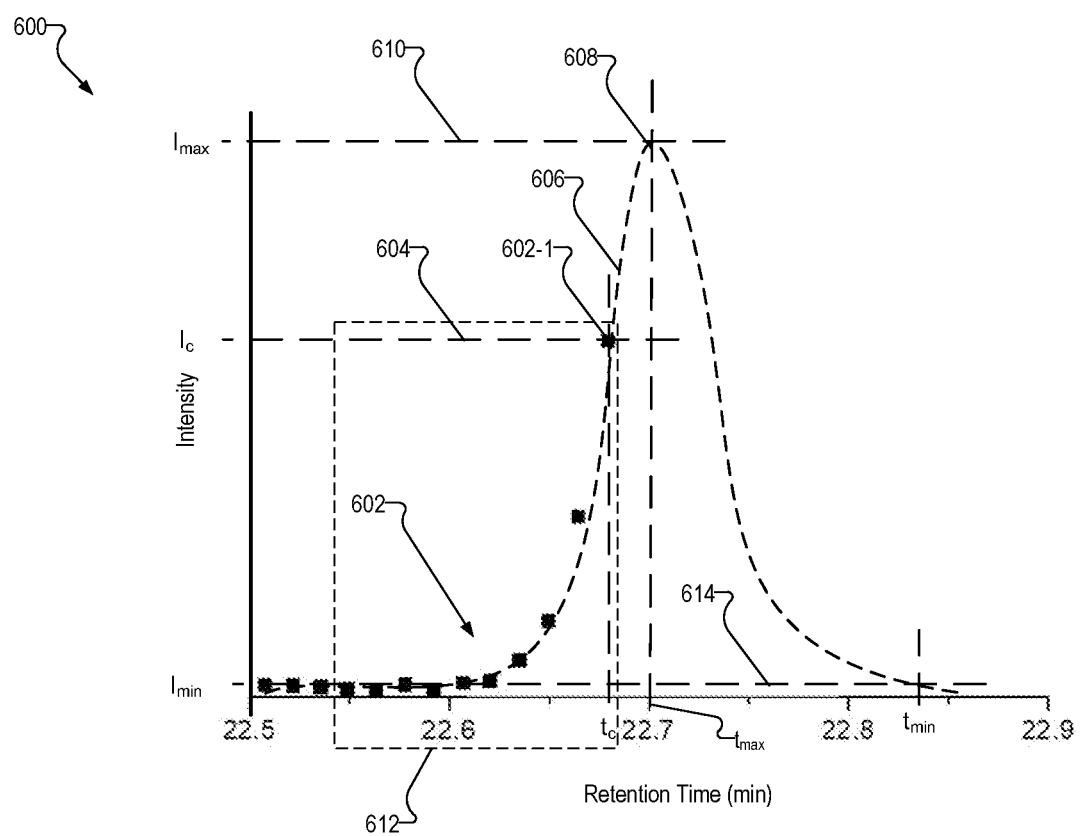
FIG. 7 shows the illustrative XIC of FIG. 6 after the acquisition of two additional survey acquisitions.

When the reference intensity value is the expected maximum intensity value $l_{max}$ of peak 606, the normalized intensity value of selected detection point 602-1 will generally range from 0 to 1. In the example of FIG. 6, system 400 may estimate the normalized intensity value of selected detection point 602-1 to be 0.15, thus indicating that the current intensity value $l_c$ of selected detection point 602-1 is about 15% of the expected intensity value $l_{max}$ at apex 608. FIG. 7 shows XIC 600 after data from two additional acquisitions. In FIG. 7, system 400 now estimates the normalized intensity value of the current detection point 602-1 to be 0.65.

In the examples described above, the reference intensity value is the expected maximum intensity value $l_{max}$ at apex 608 of peak 606. However, any other normalization scheme may be used, and the reference intensity value may be any other suitable reference value, such as a known running average intensity value for the selected m/z, a global maximum intensity value for multiple different m/z, a recent maximum intensity value for the selected m/z, etc.

In the examples just described, the relative position of selected detection point 602-1 is the normalized intensity value of selected detection point 602-1. However, as mentioned above, in other examples the relative position of selected detection point 602-1 may be a temporal distance of selected detection point 602-1 to a reference point.

In some examples, as shown in FIGS. 6 and 7, the reference point may occur at an expected time $t_{max}$ at which the intensity value of peak 606 is expected to reach maximum intensity value $l_{max}$ at apex 608. System 400 may estimate the temporal distance (e.g., a difference between $t_{max}$ and $t_c$) of the selected detection point 602-1 to the reference point in any suitable way. In some examples, the temporal distance is estimated in a manner similar to estimating the normalized intensity value of selected detection point 602-1. For example, set 612 of detection points 602 and/or the estimated normalized intensity values are applied as inputs to estimation model 518, which is additionally or alternatively configured to estimate expected time $t_{max}$ based on a set of historical detection points. As shown in FIG. 6, system 400 may estimate, based on set 612, a temporal distance of selected detection point 602-1 to be 0.05 minutes (e.g., 3 seconds). As shown in FIG. 7, system 400 may estimate, based on set 612, the temporal distance of selected detection point 602-1 to be 0.02 minutes (e.g., 1.2 seconds).

Figure 8:
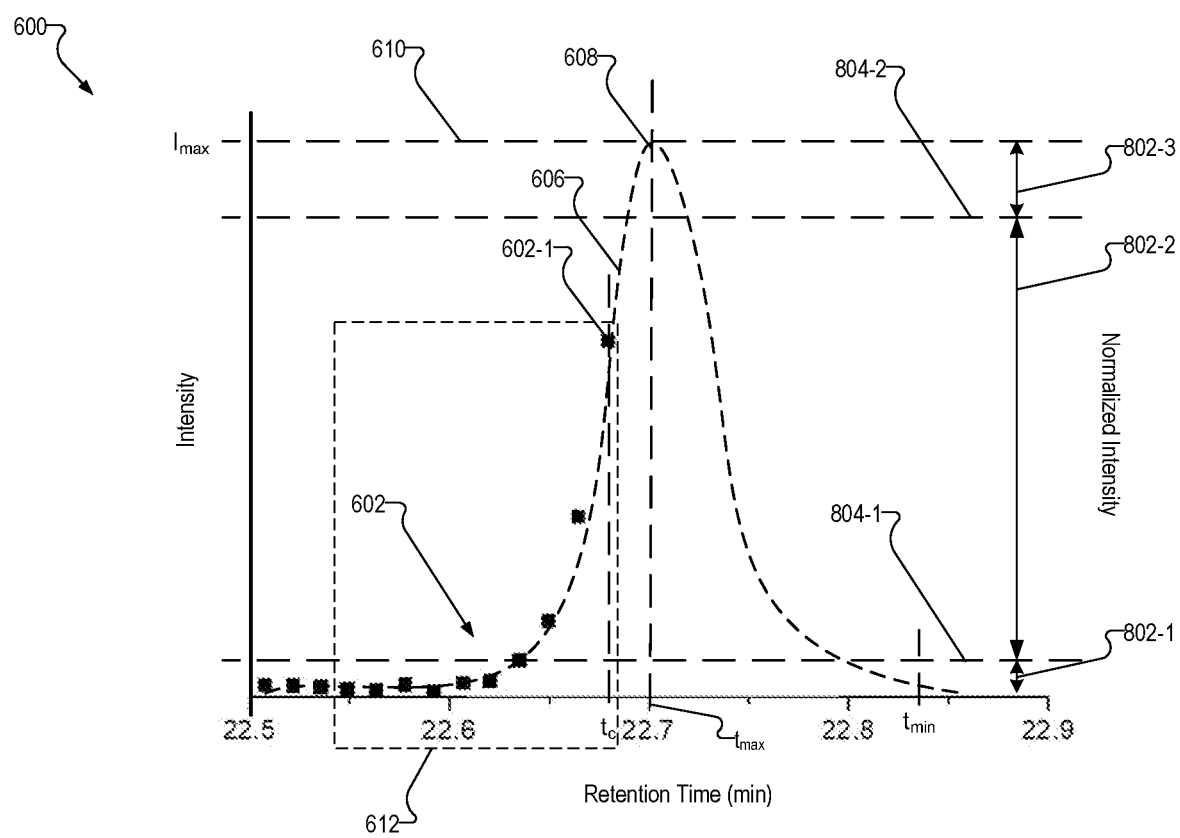
FIG. 8 shows an illustrative division of an elution profile of the XIC shown in FIG. 7 into distinct regions.

In yet other examples, the relative position of selected detection point 602-1 is a region of the expected elution profile in which selected detection point 602-1 is located. FIG. 8 shows an illustrative division of the elution profile of XIC 600 shown in FIG. 7 into distinct regions 802 (e.g., regions 802-1 through 802-3). While FIG. 8 shows three distinct regions 802, any other suitable number of regions may be used.

As shown in FIG. 8, regions 802 are divided based on normalized intensity values and relative to a reference intensity point in the elution profile (e.g., apex 608). For example, a first region 802-1 (a "baseline region") is located below a first threshold normalized intensity value 804-1 (e.g., 0.1). A second region 802-2 (a "changing region") is located between first threshold normalized intensity value 804-1 and a second threshold normalized intensity value 804-2 (e.g., 0.8). A third region 802-3 (an "apex region") is located above the second threshold normalized intensity value 804-2. The configuration of regions 802 shown in FIG. 8 is merely illustrative, as any other configuration may be used. For example, regions 802 may be further defined based on a direction of change of the normalized intensity value. For example, a portion of region 802-2 on the left side of apex 608 (or prior to expected time $t_{max}$) may be a "rising region" and a portion of region 802-2 on the right side of apex 608 (or after expected time $t_{max}$) may be a "falling region."

Figure 9:
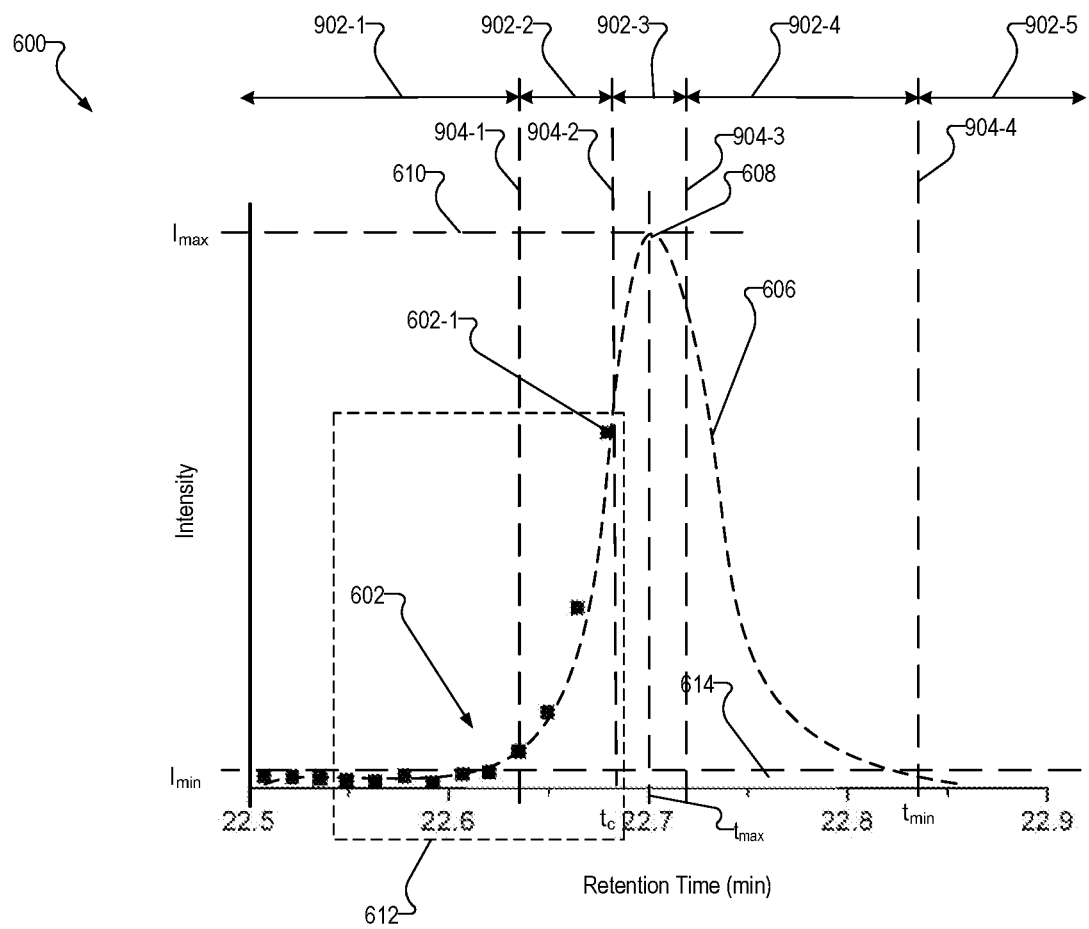
FIG. 9 shows another illustrative division of the elution profile of the XIC shown in FIG. 7 into distinct regions.

In additional or alternative examples, the elution profile may be divided into regions based on time and relative to a reference point in the elution profile (e.g., expected time $t_{max}$). FIG. 9 shows an illustrative division of the elution profile of XIC 600 shown in FIG. 7 into distinct regions 902 (e.g., regions 902-1 through 902-5). While FIG. 9 shows five distinct regions 902, any other suitable number of regions may be used. As shown, a first region 902-1 (a "baseline region") is located prior to a first threshold temporal distance 904-1 before expected time $t_{max}$ (e.g., 0.6 min). A second region 902-2 (a "rising region") is located between first threshold temporal distance 904-1 and a second threshold temporal distance 904-2 before expected time $t_{max}$ (e.g., 0.2 min). A third region 902-3 (an "apex region") is located between second threshold temporal distance 904-2 and a third threshold temporal distance 904-3 after expected time $t_{max}$ (e.g., 0.2 min). Generally, an apex region encompasses apex 608. A fourth region 902-4 (a "falling region") is located between third threshold temporal distance 904-3 and a fourth threshold temporal distance 904-4 after expected time $t_{max}$ (e.g., 1.4 min). A fifth region 902-5 (a "baseline region") is located after fourth threshold temporal distance 904-4. The configuration of regions 902 shown in FIG. 9 is merely illustrative, as any other configuration may be used. For example, any one or more regions 902 may be defined relative to another reference point, such as an expected time $t_{min}$ at which the intensity value is expected to reach a minimum value $l_{min}$.

System 400 may estimate a region 802 or 902 in which selected detection point 602-1 is located in any suitable way. In some examples, system applies set 612 to estimation model 518, which is configured to classify selected detection point 602-1 according to the region in which it is located. In the example of FIG. 8, system 400 may estimate, based on set 612 and estimation model 518, that selected detection point 602-1 is located within region 802-2. In the example of FIG. 9, system 400 may estimate, based on set 612 and estimation model 518, that selected detection point 602-1 is located within region 902-2.

Referring again to FIG. 5, in operation 520 a data-dependent action is performed based on the estimated relative position of the selected detection point (e.g., the selected detection point 602-1). Operation 520 may be performed in any suitable way.

In some examples, the data-dependent action comprises performing a dependent acquisition. For example, mass spectrometer 104 may perform a dependent acquisition (e.g., tandem mass spectrometry, such as an MS/MS scan). The dependent acquisition may be based on the estimated relative position in any suitable way.

In some examples, system 400 may compare the estimated normalized intensity value with a threshold value. The threshold value may be any suitable value, such as a value between about 0.5 and about 1.0, a value between about 0.8 and about 1.0, and/or any other suitable value. Mass spectrometer 104 may perform the dependent acquisition in response to a determination that the estimated normalized intensity value of the selected m/z exceeds the threshold value.

Triggering of a dependent acquisition based on an estimated normalized intensity value will now be explained with reference to FIGS. 6 and 7. If the threshold value is set at 0.6, the current detection point 602-1 in FIG. 6 has a normalized intensity value of 0.15 and thus does not trigger performing a dependent acquisition. In FIG. 7, the normalized intensity value of the current detection point 602-1 is now 0.65 and thus triggers a dependent acquisition.

Various alternative triggering schemes may be used based on one or more estimated normalized intensity values. For example, a dependent acquisition may be triggered by a determination that successive normalized intensity values estimated by system 400 follow a particular sequence. For example, the particular sequence may include a normalized intensity value less than, followed by a normalized intensity value near 1 (e.g., within a predetermined tolerance of 1, such as above 0.8), followed by a normalized intensity value less than 1 again. Another alternative triggering scheme may be based on a rate of change of estimated normalized intensity value for the selected m/z. For example, a dependent acquisition may be triggered when the rate of change of the estimated normalized intensity value (e.g., the slope of a curve when the estimated normalized intensity value is plotted as a function of time) is below a threshold value.

Triggering of a dependent acquisition may also be based on an estimated temporal distance. For example, system 400 may compare the estimated temporal distance of the selected detection point with a threshold value. The threshold value may be any suitable value, such as a value between about 0.1 minutes and about 1 minute, a value between about 0.1 and about 0.5 minutes, and/or any other suitable value. Mass spectrometer 104 may perform the dependent acquisition in response to a determination that the estimated temporal distance of the selected detection point is less than the threshold value.

Triggering of a dependent acquisition may also be based on an estimated region in which the selected detection point is located. For example, mass spectrometer 104 may perform the dependent acquisition in response to a determination that the selected detection point is located within a rising region, an apex region, and/or a falling region.

With the triggering schemes described above, the dependent acquisition is performed when the intensity of the ions produced from the component of interest are at or near the apex of the component's elution profile. As a result, a relatively short ion accumulation time may be set for the dependent acquisition and a greater number of dependent acquisitions may be acquired. That is, the limit of detection of components included in the sample is improved because there is a maximum amount of time that may be spent accumulating ions for an analysis, limited on the upper end by the width of the elution peak and the capacity of the ion storage device. If an MS/MS mass spectrum is acquired when the flux of the ions is higher, a higher quality mass spectrum with higher signal-to-noise ratio will be acquired in a shorter amount of time.

In further examples, the data-dependent action comprises scheduling a future performance of a dependent acquisition for the selected m/z. For example, system 400 may schedule the dependent acquisition to be performed at estimated expected time $t_{max}$ or at any other suitable time. In this way, a dependent acquisition may be scheduled and subsequently performed when the intensity value of detected ions is at or near the maximum intensity value.

In some examples, a scheduling action may be based on relative position criteria. For example, system 400 may schedule a future performance of a dependent acquisition in response to a determination that the estimated normalized intensity value is less than a threshold value, the estimated temporal distance is greater than a threshold time value, and/or the selected detection point is not located in a particular region. System 400 may also initiate an immediate dependent acquisition in response to a determination that the estimated normalized intensity value exceeds the threshold value, the estimated temporal distance is less than the threshold time value, and/or the selected detection point is located in the particular region. In some examples, system 400 may schedule a future performance of a dependent acquisition in response to a determination that the estimated normalized intensity value exceeds a minimum threshold value (e.g., 0.3) but is less than a maximum threshold value (e.g., 0.7). Similarly, system 400 may schedule a future performance of a dependent acquisition in response to a determination that the estimated temporal distance is less than a maximum threshold value (e.g., 0.5 minutes) but is greater than a minimum threshold value (e.g., 0.2 minutes). Similarly, system 400 may schedule a future performance of a dependent acquisition in response to a determination that the selected detection point is located in a rising region but not in a baseline region or an apex region.

In some analyses, multiple different components included in sample 108 may co-elute from liquid chromatograph 102 at substantially the same time. Accordingly, operations 512, 516, and 520 may be performed for multiple different selected m/z.

Figure 10:
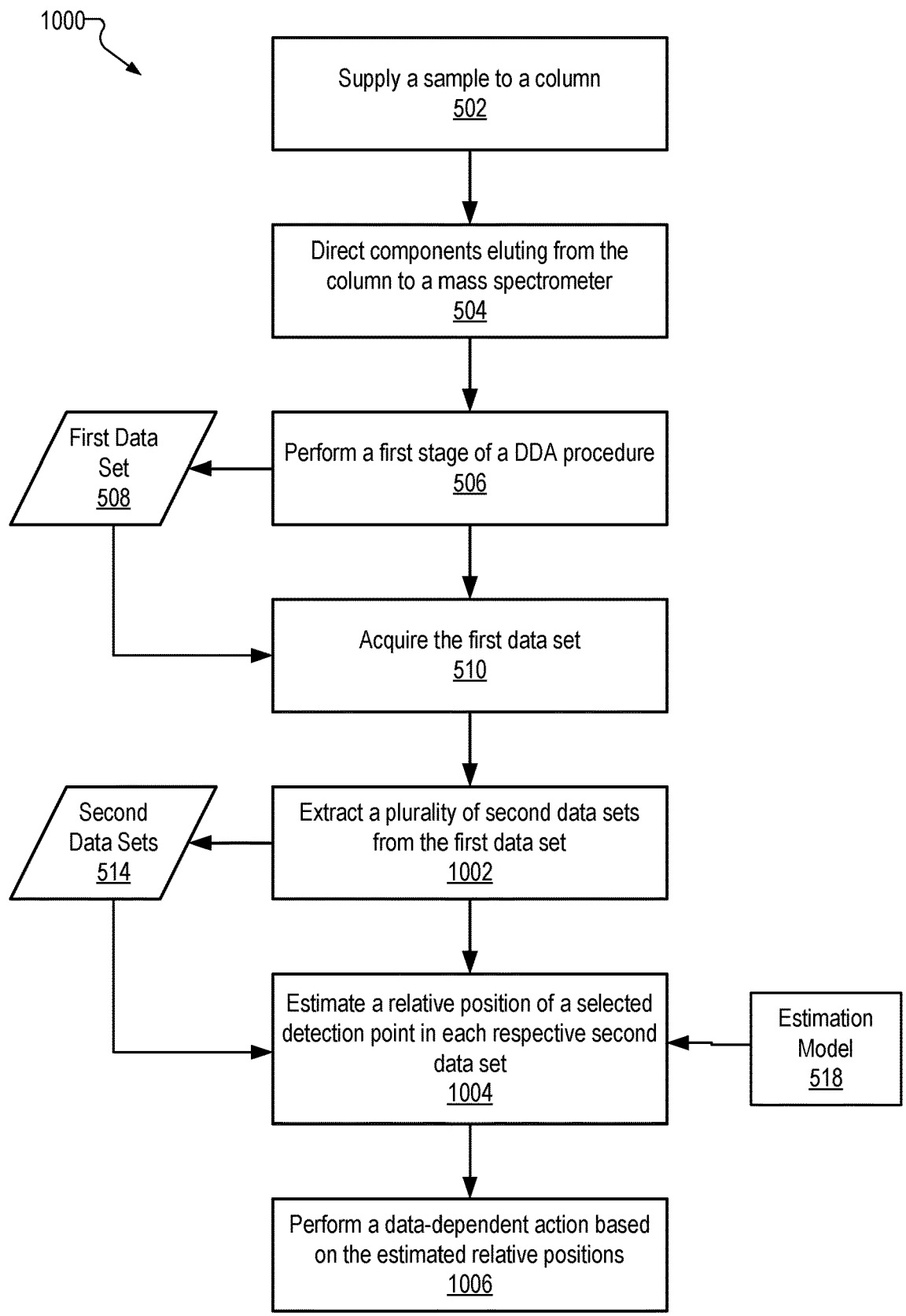
FIG. 10 shows another illustrative method of performing tandem mass spectrometry with the liquid chromatography-mass spectrometry system of FIG. 1 and the mass spectrometry control system of FIG. 4.

FIG. 10 shows an illustrative method of performing tandem mass spectrometry with LC-MS system 100 and system 400 to efficiently analyze a plurality of components of interest (corresponding to multiple different m/z). While FIG. 10 shows illustrative operations according to one embodiment, other embodiments may omit, add to, reorder, and/or modify any of the operations shown in FIG. 10. FIG. 10 is similar to FIG. 5 except that operations 512, 516, and 520 are replaced in FIG. 10 by operations 1002, 1004, and 1006. Accordingly, only operations 1002, 1004, and 1006 will be described.

In operation 1002, system 400 extracts a plurality of second data sets 514 from first data set 508. Each second data set 514 corresponds to a different selected m/z and includes a plurality of detection points representing intensity, as detected by mass spectrometer 104, as a function of retention time for the respective selected m/z.

In operation 1004, system 400 estimates a relative position of a selected detection point included in each respective second data set 514 based on each respective second data set 514 and estimation model 518. Each relative position represents a position of the selected detection point to a reference point for the respective selected m/z. Thus, system 400 estimates a plurality of relative positions for a plurality of different selected m/z. Operation 1004 may be performed in any suitable way, including any way described herein.

In operation 1006, a data-dependent action is performed based on the plurality of estimated relative positions. Operation 1006 may be performed in any suitable way, including any way described herein.

In some examples, the data-dependent action comprises sorting the selected m/z based on an order or ranking of the plurality of estimated relative positions and performing the data-dependent action based on the sorting. For example, a sorting rule may specify that dependent acquisitions for a plurality of selected m/z are to be performed in order of normalized intensity value (e.g., from high to low) and/or temporal distance. To illustrate, a first selected m/z may have a normalized intensity value of 0.52, a second m/z may have a normalized intensity value of 0.72, and a third m/z may have a normalized intensity value of 0.61. Thus, a dependent acquisition for the second m/z is performed (or scheduled to be performed) first, a dependent acquisition for the third m/z is performed (or scheduled to be performed) second, and a dependent acquisition for the first m/z is performed (or scheduled to be performed) third. In some examples, the dependent acquisition is performed (or scheduled to be performed) only for the selected m/z having an estimated normalized intensity value above (or below) a threshold value.

In some examples, the data-dependent action comprises scheduling future dependent acquisitions for each selected m/z. For example, system 400 may estimate, based on each estimated normalized intensity value, an expected time at which the intensity value of each selected m/z will reach its maximum intensity value or will be located within a particular region (e.g., an apex region). System 400 may schedule the dependent acquisitions to be performed at the estimated expected times. In this way, the order of performing a plurality of dependent acquisitions may be optimized.

In some examples, the data-dependent action may comprise a filtering operation. For example, system 400 may perform (or abstain from performing) a data-dependent action for the selected m/z having an estimated normalized intensity value that is less than a threshold value, having an estimated temporal distance exceeding a threshold value, or located outside of a particular region. To illustrate, system 400 may schedule the future performance of a dependent acquisition for only those selected m/z having an estimated normalized intensity value that is less than a threshold value, having an estimated temporal distance greater than a threshold time value, or located in a particular region (e.g., a baseline region). As another illustration, a dependent acquisition may be triggered for only the selected m/z having an estimated normalized intensity value that exceeds a threshold value (e.g., 0.6), having an estimated temporal distance less than a threshold time value, or located in a particular region (e.g., a rising region).

In some examples, dynamic exclusion may be applied during a dependent acquisition. Accordingly, estimation model 518 may be configured to determine a dynamic exclusion window for dynamic exclusion. Referring again to FIGS. 6 and 7, a width of peak 606 and/or an expected time $t_{min}$ at which the intensity value of peak 606 is expected to reach a minimum value $l_{min}$, as indicated by dashed line 614, may also be estimated based on set 612 of detection points 602 and estimation model 518. In the example of FIGS. 6 and 7, Imin is shown to be greater than zero, but in some embodiments Imin may be set to zero. The estimated peak width and/or expected time $t_{min}$ may be used to set the dynamic exclusion window. For example, the dynamic exclusion window may be set from expected time $t_{max}$ to expected time $t_{min}$ to exclude triggering a dependent action on the back half of peak 606.

Figure 11:
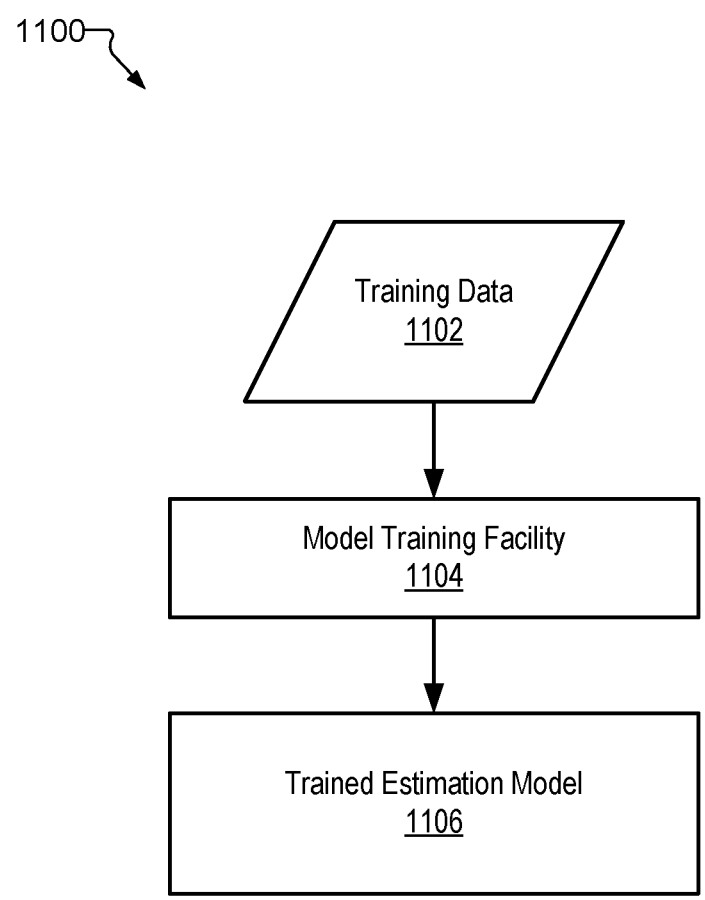
FIG. 11 shows an illustrative method for training a machine learning model that may implement an estimation model.

As mentioned, in some examples estimation model 518 comprises a machine learning model configured to estimate a relative position of a selected detection point of a selected m/z. Illustrative methods of training a machine learning model will now be described. FIG. 11 illustrates a method 1100 for training a machine learning model that may implement estimation model 518. As shown, training data 1102 may be provided to a model training facility 1104, which may utilize the training data 1102 to train an estimation model 1106. The examples that follow describe training estimation model 1106 to estimate a normalized intensity value of a selected detection point for a selected m/z. However, the same principles may be applied to train estimation model to estimate a temporal distance of the selected detection point from a reference point and/or to estimate an elution profile region in which the selected detection point is located.

Model training facility 1104 may perform any suitable heuristic, process, and/or operation that may be configured to train a machine learning model. In some examples, model training facility 1104 may be implemented by hardware and/or software components (e.g., processors, memories, communication interfaces, instructions stored in memory for execution by the processors, etc.), such as storage facility 402 and/or processing facility 404 of system 400.

Estimation model 1106 may be any suitable type of machine learning model, such as a neural network model (e.g., a convolutional neural network (CNN)), a Boosted Decision Tree regression model, a Decision Forest regression model, a Fast Forest Quantile regression model, and an ordinal regression model.

Figure 12:
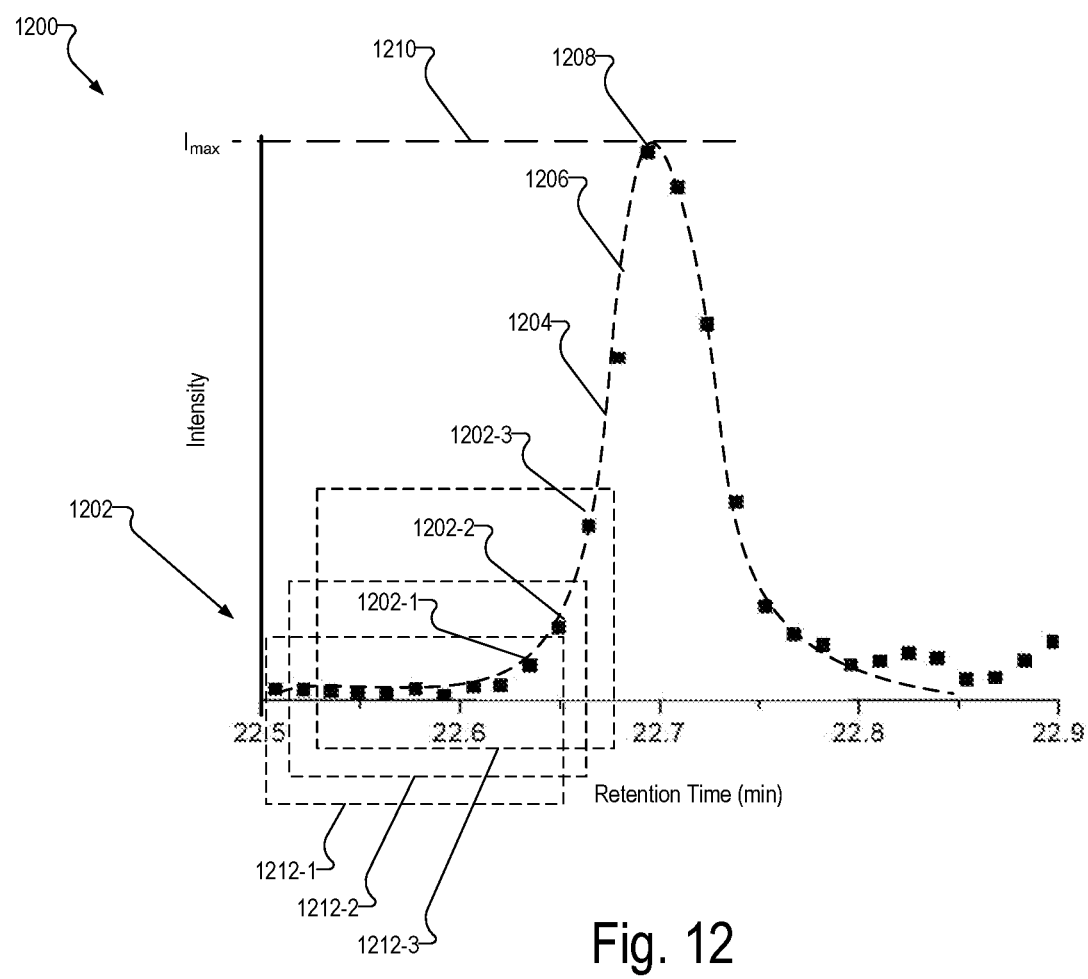
FIG. 12 shows an illustrative XIC that may be generated from, or is representative of, training data that may be used for training the machine learning model of FIG. 11.

Training data 1102 may be acquired or extracted from data representative of one or more elution profiles (e.g., a set of LC-MS detection points) for one or more selected m/z. FIG. 12 illustrates a data set that may be included in training data 1102. FIG. 12 shows an illustrative XIC 1200 for a selected m/z and that may be generated from, or is representative of, data acquired from a combined separation-mass spectrometry system (e.g., LC-MS system 120). It will be recognized that estimation model 1106 may be trained based on XIC 1200 source data without generating XIC 1200. As shown, XIC 1200 plots a plurality of detection points 1202 each representing a detected intensity value of the selected m/z, as detected by a mass spectrometer during full-spectrum acquisitions, and retention time (min). Each successive acquisition adds a new detection point 1202 to XIC 1200. Detection points 1202 together form an elution profile 1204 of the component associated with the selected m/z. Elution profile 1204 includes a peak 1206 having an apex 1208 at which a detected intensity is at a maximum intensity value $l_{max}$, as indicated by dashed line 1210.

Training of estimation model 1106 is based on the principle that the normalized intensity value (or temporal distance or assigned region) of a selected detection point 1202 (e.g., a ratio of the detected intensity value of the selected detection point 1202 to a known reference intensity value, such as $l_{max}$) is a function of the detected intensity levels of one or more historical detection points 1202 from the same experiment. Accordingly, training data 1102 applied to model training facility 1104 comprises a series of input vectors for the selected m/z, each input vector having detected intensity values for a distinct set of detection points 1202. Each input vector may comprise any distinct set of detection points 1202 as may serve a particular implementation. For example, a first input vector may comprise detected intensity values for a first set 1212-1 of detection points 1202, a second input vector may comprise intensity values for a second set 1212-2 of detection points 1202, a third input vector may comprise intensity values for a third set 1212-3 of detection points 1202, and so on.

In the example of FIG. 12, each input vector includes intensity values for ten detection points 1202. However, each input vector may include intensity values for any other suitable number of detection points 1202 (e.g., 6, 12, 24, etc.). Alternatively, each input vector may include intensity values for all detection points 1202 included in one or more prior input vectors.

In some examples, detection points 1202 may not be evenly spaced along the time axis. To simplify training of estimation model 1106, detection points 1202 may be corrected (such as by interpolation) to a fixed and uniform time spacing (e.g., 1 second).

Any number of input vectors for a selected m/z may be applied to model training facility 1104. In some examples, the number of input vectors is selected so as to encompass at least a full half-width of peak 1206. In the example of FIG. 12, five input vectors having intensity values for ten detection points each would encompass at least a full half-width of peak 1206. Alternatively, the number of input vectors may be selected so as to encompass a full width of peak 1206. Input vectors that encompass the full width of peak 1206 may be used to train estimation model 1106 to estimate an expected time $t_{min}$ at which the intensity value of a peak is expected to reach a minimum value, which may be used in setting a dynamic exclusion window.

A particular detection point 1202 is selected for each input vector as a selected detection point. Any detection point 1202 included within each respective input vector may be selected. In the examples that follow, the selected detection point 1202 for each input vector is the right-most (most recent) detection point 1202 included in the respective input vector. For example, the first input vector includes detection point 1202-1 as the selected detection point, the second input vector includes detection point 1202-2 as the selected detection point, and the third input vector includes detection point 1202-3 as the selected detection point. In alternative examples, the selected detection point 1202 is not the right-most detection point but may be any other suitable detection point (e.g., detection point 1202-1 is the selected detection point for the second input vector defined by set 1212-2, detection point 1202-2 is the selected detection point for the third input vector defined by set 1212-3, etc.).

Training data 1102 also includes the known desired output values from estimation model 1106. The known desired output values comprise the normalized intensity values of each selected detection point 1202 for each input vector (or the temporal distance values of each selected detection point 1202 for each input vector or a region of elution profile 1204 in which each selected detection point 1202 is located). The normalized intensity values are known because the reference intensity value (e.g., $1_{max}$) is known. The known output values may be used for supervised training of estimation model 1106.

To simplify training of estimation model 1106, detection points 1202 may in some examples be corrected based on the known reference intensity value. That is, the detected intensity value of each detection point 1202 may be normalized based on the known reference value.

In the examples described above, the reference intensity value is the expected maximum intensity value $1_{max}$ at apex 1208 of peak 1206. However, any other normalization scheme may be used, and the reference intensity value may be any other suitable reference value, such as a known running average intensity value for the selected m/z, a global maximum intensity value for multiple different m/z, a recent maximum intensity value for the selected m/z, etc.

In some examples, training data 1102 may be split into two sets of data, such that a first set of training data may be used for training estimation model 1106 and a second set of training data may be used to score estimation model 1106. For example, training data 1102 may be split so that a first percentage (e.g., 75%) of the input vectors may be used as the training set for training estimation model 1106, and a second percentage (e.g., 25%) of the input vectors may be used as the scoring set to generate an accuracy score for estimation model 1106.

During a training phase, model training facility 1104 may run one or more sessions to train estimation model 1106 based on training data 1102 to estimate a normalized intensity value of a selected detection point 1202. Model training facility 1104 may also run one or more sessions to train estimation model 1106 based on training data 1102 to estimate a temporal distance of the selected detection point to a reference time, e.g., an expected time $t_{max}$ at which the intensity value of an elution profile is expected to reach maximum intensity value (e.g., an apex of the elution profile) and/or an expected time $t_{min}$ at which the intensity value of the elution profile is expected to reach a minimum intensity value. Model training facility 1104 may also run one or more sessions to train estimation model 1106 based on training data 1102 to estimate a region in which the selected detection point is located. Model training facility 1104 may use any suitable machine learning technology or algorithm to perform operations to facilitate learning, by a machine learning model, of how to fit the machine learning model to the detected intensity values within the first set of training data 1102.

Completion of a training phase, by model training facility 1104, may result in trained estimation model 1106 that is configured to estimate a relative position of a selected detection point. The trained estimation model 1106 may be stored in a data store, such as storage facility 402, and may be executed during runtime by any suitable computing component, including processing facility 404.

As mentioned, training data 1102 may include data for multiple different selected m/z. If data for multiple different selected m/z and/or under different chromatography conditions is acquired from survey acquisitions with a period short enough to characterize the chromatographic peaks (the Nyquist limit), trained estimation model 1106 may be applicable to experimental data sets that may use different chromatography conditions and have different peak widths. The Nyquist limit for a Gaussian curve is six points. Thus, if training data 1102 includes six detection points across a chromatographic peak, interpolation to a fixed time spacing between the sampled points could be robust.

In alternative examples, estimation model 1106 may be trained based on training data 1102 configured for a specific application, such as a specific m/z, specific chromatographic conditions, a specific sample type, etc. In such examples, estimation model 1106 could be trained after acquiring data for an initial priming experiment, and estimation model 1106 could be used thereafter only for subsequent iterations of that specific experiment.

In some examples, estimation model 1106 may be refined or further trained in real time (e.g., during an experiment), such as if it is found that estimated normalized intensity values or estimated temporal distances are deviating significantly (e.g., by a predetermined amount) from the actual values (which may be subsequently detected as the experiment progresses).

Various modifications may be made to the systems and methods described herein without departing from the scope and principles of the concepts described herein. For instance, in the examples described above the training of an estimation model and estimation of a relative position of a selected detection point is based on a plurality of detection points for a selected m/z (e.g., an XIC). In some modifications, training of an estimation model and estimation of a relative position of a selected detection point may be based on the signals of multiple m/z values or all m/z values (e.g., a total ion current (TIC) chromatogram).

In additional modifications, a separation device (e.g., a liquid chromatograph, a gas chromatograph, a capillary electrophoresis device, etc.) and/or a mass spectrometer (e.g., mass spectrometer 124) may include or may be coupled with an ion mobility analyzer, and data acquired by the ion mobility analyzer may be used to train an estimation model and estimate a relative position of a selected detection point in a manner similar to the methods described above for data acquired by the mass spectrometer. For example, a first set of data acquired with an ion mobility analyzer and a mass analyzer may include a series of mass spectra including intensity values of ions produced from the sample components as a function of m/z and/or ion mobility of the ions (e.g., a collision cross-section (CCS) of the ions). A second set of data may be extracted from the first set of data. The extracted second set of data may include a plurality of detection points representing intensity, as detected by the mass analyzer, as a function of time for a selected m/z and/or a selected CCS or range of CCS. The second set of data may be used in any way described herein, such as to train an estimation model and to estimate, during a DDA procedure, a relative position of a selected detection point for the selected CCS or range of CCS.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
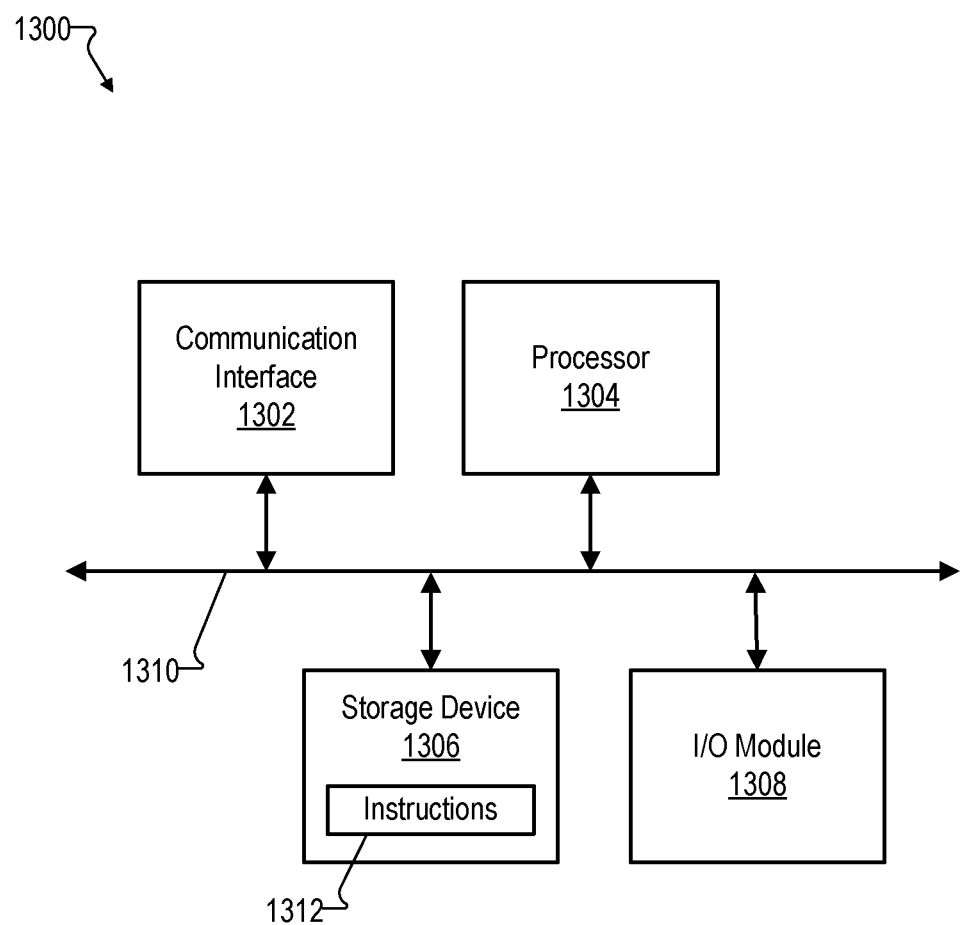
FIG. 13 shows an illustrative computing device.

FIG. 13 shows an illustrative computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected one to another via a communication infrastructure 1310. While an illustrative computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data and/or interpreting, executing, and/or directing execution of one or more of the instructions, processes, and/or operations described herein. Processor 1304 may perform operations by executing computer-executable instructions 1312 (e.g., an application, software, code, and/or other executable data instance) stored in storage device 1306.

Storage device 1306 may include one or more data storage media, devices, or configurations and may employ any type, form, and combination of data storage media and/or device. For example, storage device 1306 may include, but is not limited to, any combination of the non-volatile media and/or volatile media described herein. Electronic data, including data described herein, may be temporarily and/or permanently stored in storage device 1306. For example, data representative of computer-executable instructions 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. One or more I/O modules may be used to receive input for a single virtual experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1300. For example, storage facility 202 may be implemented by storage device 1306, and processing facility 204 may be implemented by processor 1304.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method of performing tandem mass spectrometry comprising:
supplying a sample to a chromatography column;
directing components included in the sample and eluting from the chromatography column to a mass spectrometer;
acquiring a series of mass spectra including intensity values of ions produced from the components as a function of m/z of the ions;
extracting, from the series of mass spectra, a plurality of detection points representing intensity as a function of time for a selected m/z;
estimating, based on the plurality of detection points extracted from the series of mass spectra and using an algorithm trained to estimate a normalized intensity value of selected detection points, a relative position of a selected detection point included in the plurality of detection points, the relative position of the selected detection point representing a position of the selected detection point relative to an expected reference point; and
performing, at the mass spectrometer and based on the estimated relative position of the selected detection point relative to an expected reference point, a dependent acquisition for the selected m/z.

2. The method of claim 1, wherein the relative position of the selected detection point comprises a normalized intensity value of the selected detection point, the normalized intensity value representing a ratio of the detected intensity value of the selected detection point to an expected maximum intensity value for the selected m/z.

3. The method of claim 2, further comprising:
determining that the normalized intensity value exceeds a threshold value;
wherein the dependent acquisition is performed in response to the determining that the normalized intensity value exceeds the threshold value.

4. The method of claim 3, wherein the threshold value is between about 0.5 and about 1.0.

5. The method of claim 3, wherein the threshold value is between about 0.8 and about 1.0.

6. The method of claim 1, wherein the relative position of the selected detection point comprises a temporal distance of the selected detection point to an expected time point for the selected m/z.

7. The method of claim 1, wherein the relative position of the selected detection point comprises a region of an expected elution profile for the selected m/z and in which the selected detection point is located.

8. The method of claim 1, wherein the dependent acquisition for the selected m/z comprises an MS/MS acquisition.

9. The method of claim 1, wherein the performing the dependent acquisition comprises:
scheduling the dependent acquisition for a future time based on the relative position of the selected detection point; and
performing the dependent acquisition at the future time.

10. The method of claim 9, wherein the scheduling the dependent acquisition comprises:
estimating, based on the estimated relative position, an expected time of a maximum intensity value for the selected m/z;
wherein the future time comprises the estimated expected time of the maximum intensity value for the selected m/z.

11. An apparatus for performing tandem mass spectrometry, comprising:
a mass spectrometer configured to receive components included in a sample and eluting from a chromatography column and analyze ions produced from the components; and
a computing device configured to:
acquire, from the mass spectrometer, a series of mass spectra including intensity values of ions produced from the components as a function of m/z of the ions;
extract, from the series of mass spectra, a plurality of detection points detected by the mass spectrometer over time for each of a plurality of different selected m/z;
estimate, based on the plurality of detection points for each respective selected m/z and using an algorithm trained to estimate a normalized intensity value of selected detection points, a relative position of a selected detection point included in each plurality of detection points, each relative position representing a position of the selected detection point relative to an expected reference point for the respective selected m/z; and
control the mass spectrometer to perform, based on the estimated relative positions of the selected detection point relative to an expected reference point, a plurality of dependent acquisitions.

12. The apparatus of claim 11, wherein:
each estimated relative position comprises a normalized intensity value of the respective selected detection point, the normalized intensity value representing a ratio of the detected intensity value of the selected detection point to an expected maximum intensity value for the selected m/z; and
the computing device is configured to control the mass spectrometer to perform the plurality of dependent acquisitions based on a numerical order of the estimated normalized intensity values.

13. The apparatus of claim 12, wherein the plurality of dependent acquisitions comprises a dependent acquisition for each selected m/z for which a corresponding selected detection point has a normalized intensity value exceeding a threshold value.

14. The apparatus of claim 13, wherein the threshold value is between about 0.5 and about 1.0.

15. The apparatus of claim 13, wherein the threshold value is between about 0.8 and about 1.0.

16. The apparatus of claim 12, wherein the controlling the mass spectrometer to perform the plurality of dependent acquisitions comprises:
scheduling each of the plurality of dependent acquisitions for a different future time based on a numerical order of the normalized intensity values; and
controlling the mass spectrometer to perform each of the plurality of dependent acquisitions at the respective future time.

17. The apparatus of claim 16, wherein the scheduling each of the plurality of dependent acquisitions comprises:
estimating, based on the estimated normalized intensity values, an expected time of a maximum intensity value for each selected m/z;
wherein each respective future time comprises the estimated expected time of the maximum intensity value for the respective selected m/z.

18. A non-transitory computer-readable medium storing instructions that, when executed, cause a processor of a computing device to:

acquire a first data set comprising a series of mass spectra including intensity values of ions produced from analytes eluting from a chromatography column as a function of m/z of the ions;

extract a second data set from the first data set, the second data set including a plurality of detection points representing intensity as a function of time for a selected mass-to-charge ratio (m/z);

estimate, based on the second data set and using an algorithm trained to estimate a normalized intensity value of selected detection points, a relative position of a selected detection point included in the second data set, the relative position of the selected detection point representing a position of the selected detection point relative to an expected reference point for the selected m/z; and control, based on the estimated relative position of the selected detection point relative to an expected reference point, the mass spectrometer to perform a data-dependent action.

19. The non-transitory computer-readable medium of claim 18, wherein the relative position of the selected detection point comprises a normalized intensity value of the selected detection point, the normalized intensity value representing a ratio of the detected intensity value of the selected detection point to an expected maximum intensity value for the selected m/z.

20. The non-transitory computer-readable medium of claim 19, wherein the controlling the mass spectrometer to perform the data-dependent action comprises:
determining that the normalized intensity value exceeds a threshold value; and
controlling, in response to the determining that the normalized intensity value exceeds the threshold value, the mass spectrometer to perform the data-dependent action.

21. The non-transitory computer-readable medium of claim 20, wherein the threshold value is between about 0.5 and about 1.0.

22. The non-transitory computer-readable medium of claim 20, wherein the threshold value is between about 0.8 and about 1.0.

23. The non-transitory computer-readable medium of claim 18, wherein the relative position of the selected detection point comprises a temporal distance of the selected detection point to an expected time point for the selected m/z.

24. The non-transitory computer-readable medium of claim 18, wherein the relative position of the selected detection point comprises a region of an expected elution profile for the selected m/z and in which the selected detection point is located.

25. The non-transitory computer-readable medium of claim 18, wherein the estimating the relative position of the selected detection point is based on intensity values of detection points included in a sliding window of the second data set, the sliding window including a current detection point.

26. The non-transitory computer-readable medium of claim 25, wherein the selected detection point comprises the current detection point.

27. The non-transitory computer-readable medium of claim 18, wherein the data-dependent action comprises performing tandem mass spectrometry.

28. The non-transitory computer-readable medium of claim 18, wherein the controlling the mass spectrometer to perform the data-dependent action comprises scheduling the mass spectrometer to perform tandem mass spectrometry for the selected m/z at a future time.

29. The non-transitory computer-readable medium of claim 28 wherein the scheduling the mass spectrometer to perform tandem mass spectrometry for the selected m/z at the future time comprises:
estimating, based on the estimated relative position of the selected detection point, an expected time of a maximum intensity value for the selected m/z;
wherein the future time comprises the estimated expected time of the maximum intensity value for the selected m/z.

30. A system comprising:
a chromatography column configured to receive a sample and separate components included in the sample;
a mass spectrometer configured to receive the components eluting from the chromatography column and analyze ions produced from the components; and
a computing device configured to:
acquire a series of mass spectra including intensity values of ions produced from the components as a function of a collision cross-section (CCS) of the ions;
extract, from the series of mass spectra, a plurality of detection points representing intensity as a function of time for a selected (CCS);
estimate, based on the plurality of detection points extracted from the series of mass spectra, a relative position of a selected detection point included in the plurality of detection points, the relative position of the selected detection point representing a position of the selected detection point relative to an expected reference point; and
control, based on the estimated relative position, the mass spectrometer to perform a dependent acquisition for the selected (CCS).

31. A method of performing tandem mass spectrometry comprising:
supplying a sample to a chromatography column;
directing components included in the sample and eluting from the chromatography column to a mass spectrometer comprising an ion mobility analyzer and a mass analyzer;
acquiring a series of mass spectra including intensity values of ions produced from the components as a function of a collision cross-section (CCS) of the ions;
extracting, from the series of mass spectra, a plurality of detection points representing intensity as a function of time for a selected CCS;
estimating, based on the plurality of detection points extracted from the series of mass spectra, a relative position of a selected detection point included in the plurality of detection points, the relative position of the selected detection point representing a position of the selected detection point relative to an expected reference point; and
performing, at the mass spectrometer and based on the estimated relative position, a dependent acquisition for the selected CCS.

* * * * *